United States Patent [19]

Lebowitz

[11] 4,385,585

[45] May 31, 1983

[54] TEAKETTLE HAVING WHISTLE CAP

[75] Inventor: Sam Lebowitz, New York, N.Y.

[73] Assignee: Copco, Inc., Secaucus, N.J.

[21] Appl. No.: 315,310

[22] Filed: Oct. 27, 1981

[51] Int. Cl.³ .......................... G08B 3/02; B65D 45/00
[52] U.S. Cl. .................................. 116/67 R; 126/388;
220/318; 222/468
[58] Field of Search .............. 116/67 R, 70; 126/388;
220/318; 222/468; 99/344

[56] References Cited

U.S. PATENT DOCUMENTS

| | | | |
|---|---|---|---|
| 1,092,056 | 3/1914 | Jennings | 220/318 |
| 2,027,537 | 1/1936 | Kircher | 126/388 X |
| 3,155,270 | 11/1964 | Taft | 200/318 |

FOREIGN PATENT DOCUMENTS 349511  1/1931  United Kingdom ................ 222/473

*Primary Examiner*—Daniel M. Yasich
*Attorney, Agent, or Firm*—Michael Ebert

[57] ABSTRACT

A teakettle for boiling water, the covered kettle having a spout projecting therefrom whose mouth is normally closed by a whistle cap having an extension arm terminating in a pinion mounted for rotation at one end of a bail secured to the kettle and serving as a handle therefor. The pinion is engaged by a rack attached to the front end of an arcuate strip slidable within the hollow bail, the rear end of the strip being coupled through a slot in the bail to an external finger pad. To pour boiling water from the kettle, the user grasps the bail with his hand and manipulates the finger pad with his finger to push the pad forward, thereby advancing the rack and causing the pinion to rotate and lift the cap from the mouth of the spout. Release of the finger pad causes the cap to drop back in place on the spout and to return the finger pad to its initial position.

8 Claims, 6 Drawing Figures

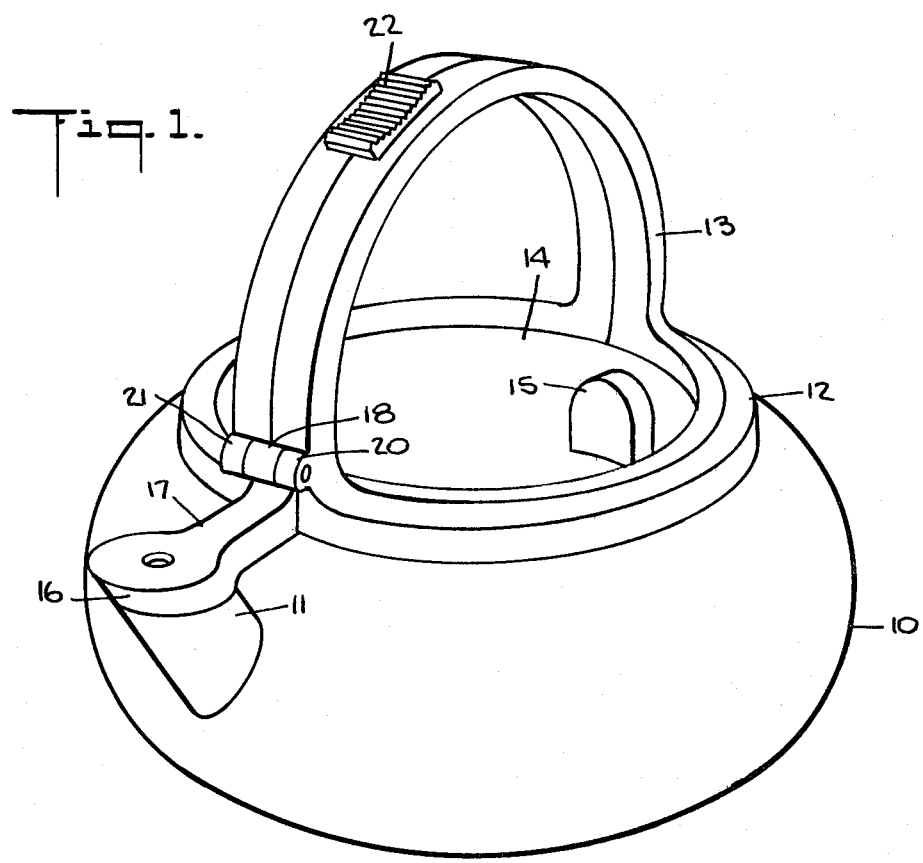
Fig. 1.
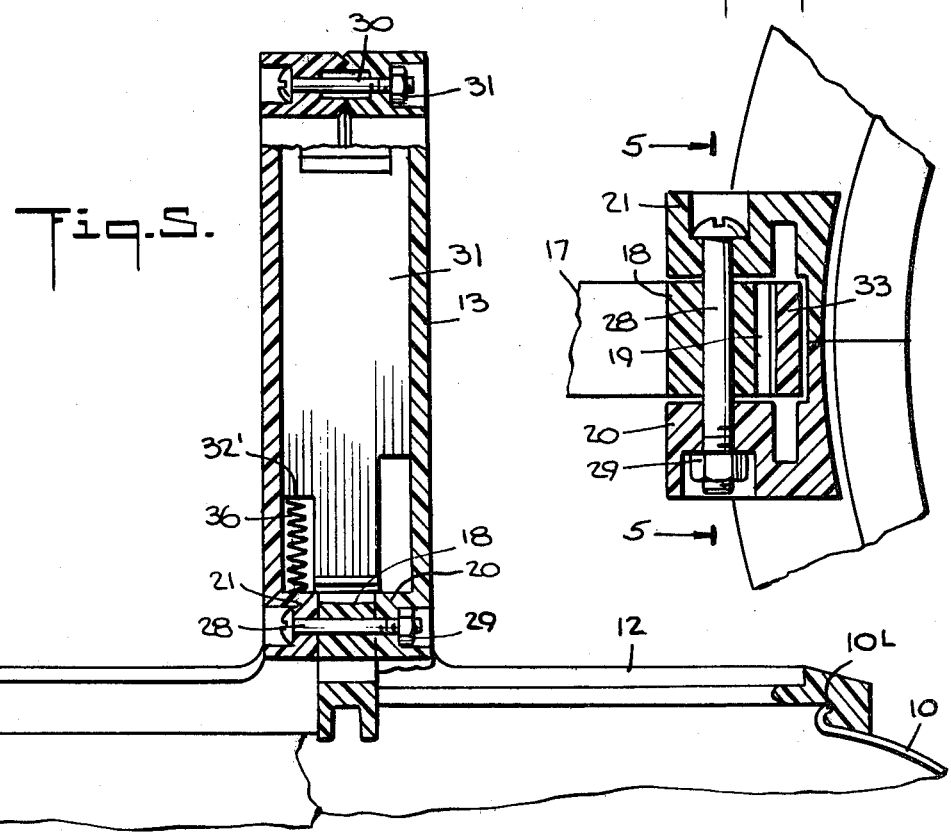
Fig. 4.
Fig. 5.

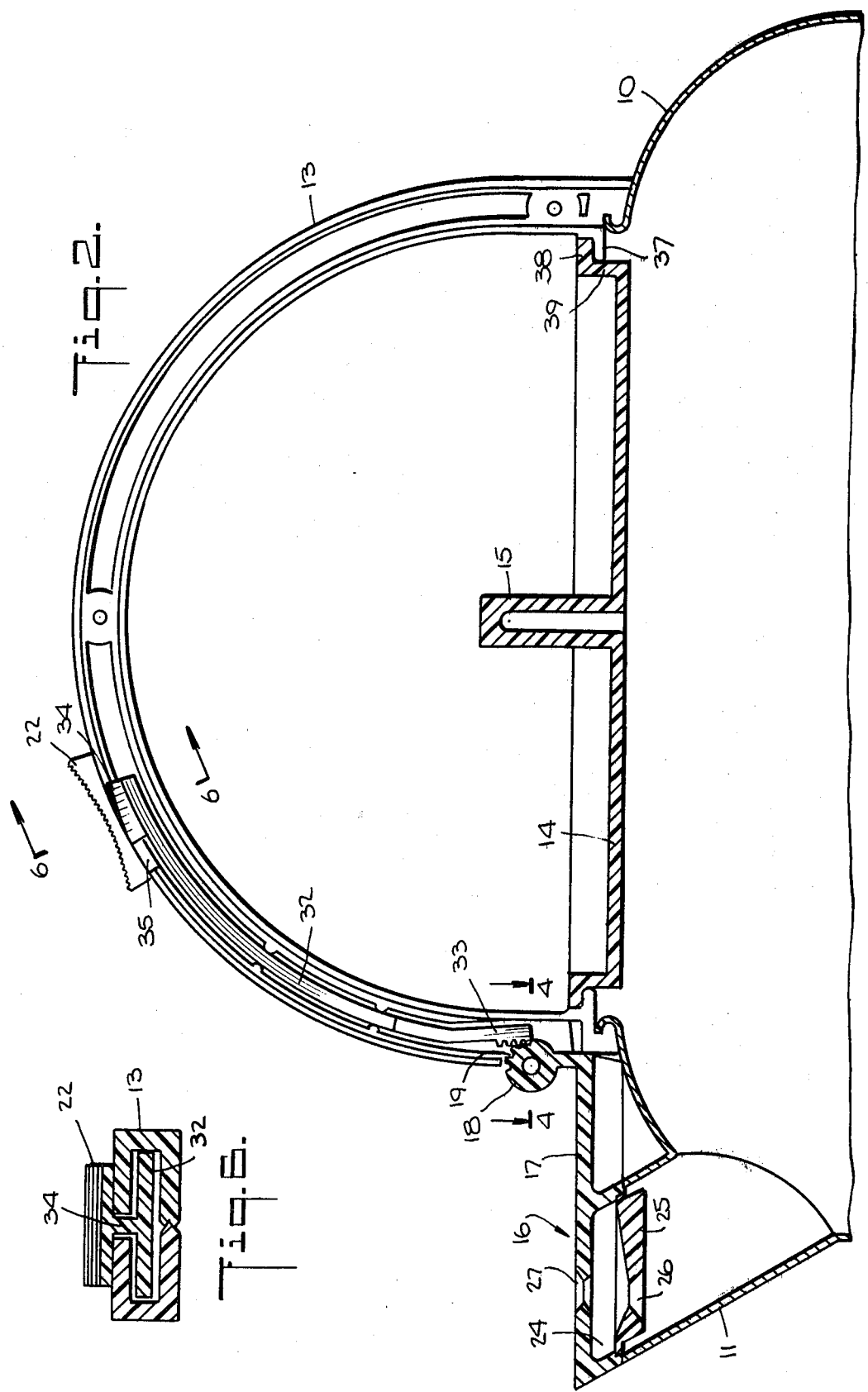

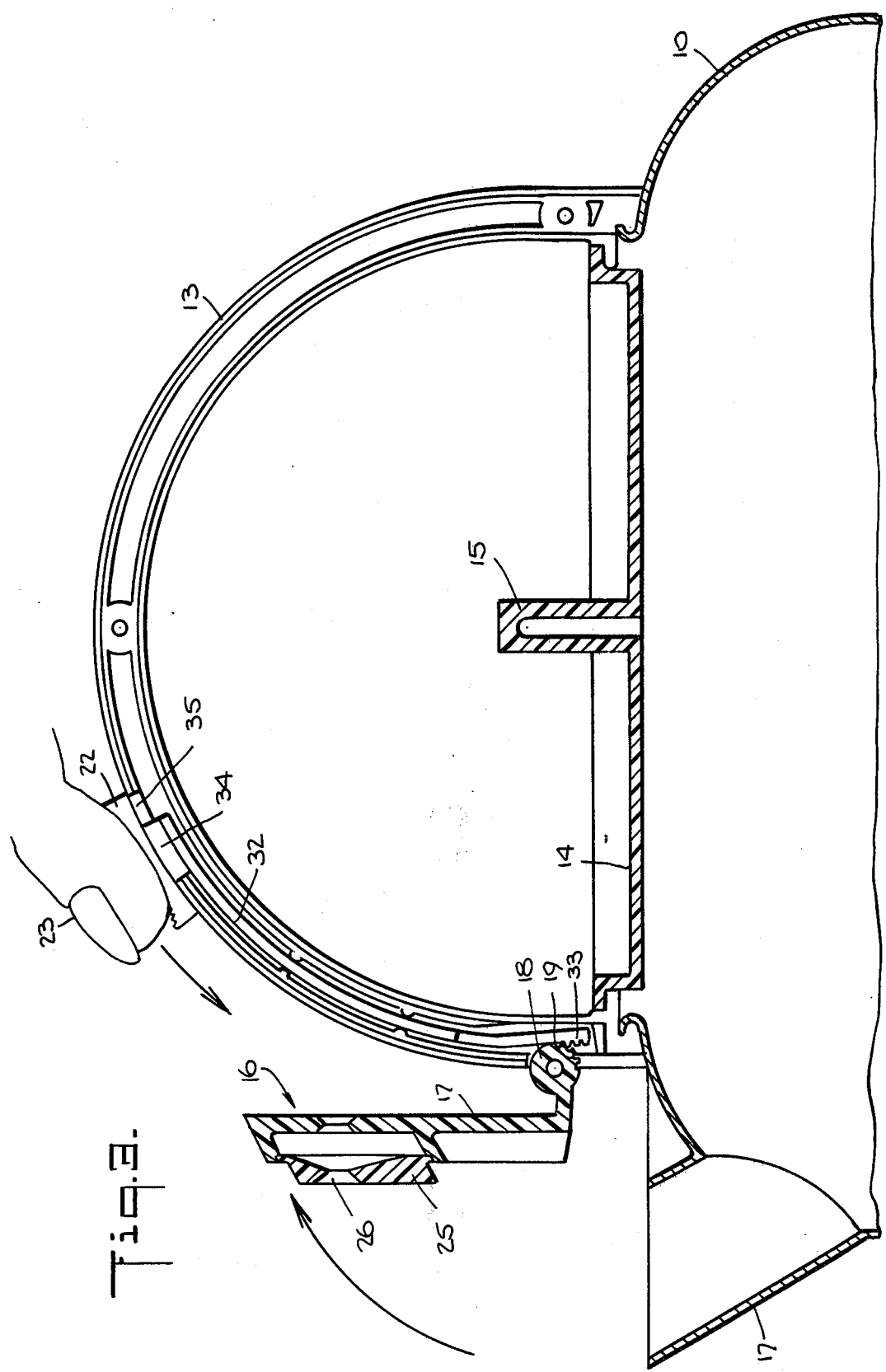

TEAKETTLE HAVING WHISTLE CAP

BACKGROUND OF INVENTION

This invention relates generally to kettles for boiling water, and more particularly to a teakettle whose spout has a whistle cap thereon which emits a whistling sound when the water in the kettle proceeds to boil.

A teakettle is a covered kettle with a handle or bail for boiling water, the kettle having a spout to dispense the water. Such kettles are used not only to boil water for brewing tea, but also for making coffee and other beverages.

The preferred technique for brewing tea or other beverages requires that the water used for this purpose be brought to the boiling point and then poured, for excessive boiling drives out oxygen dissolved in the water and tends to impart a flat taste to the beverage. It therefore becomes desirable to know just when the water is brought to a boil.

To this end, the present practice is to pivotally mount over the mouth of the spout a whistle cap which emits a shrill sound when steam is forced therethrough, indicating that boiling is taking place. The whistle for this purpose includes a cavity through which passes the pressurized steam discharged from the spout.

In order to pour the boiling water from the kettle, it is necessary to lift the whistle cap from the spout. To facilitate this operation, the pivoted whistle is ordinarily provided with a finger-operated lever.

The difficulty usually experienced with a conventional teakettle having a whistle-capped spout is that the user who holds the kettle by its handle is also required with a finger of this hand to manipulate the lever of the cap. If the user grasps the arched handle at its top, then the lever of the cap may be out of reach of the finger and the user must shift the position of his hand to reach the lever. This operation is awkward and somewhat difficult to execute, particularly since the kettle then contains boiling water and must be carefully handled.

SUMMARY OF INVENTION

In view of the foregoing, the main object of this invention is to provide a teakettle whose spout is normally closed by a whistle cap which can be lifted by operating a finger pad positioned close to the top of the teakettle handle, so that the user is able to lift the cap without shifting the position of his hand on the handle, the cap reverting to its initial position when the pad is released.

More particularly, an object of the invention is to provide a teakettle of the above type in which the mechanism for manipulating the whistle cap is concealed within the handle and therefore does not alter or degrade the appearance of the teakettle.

Also an object of the invention is to provide a teakettle having a hollow bail serving as a handle, the bail being integrated with the rim of the kettle and being readily attachable to the kettle.

Still another object of the invention is to provide a teakettle having a liftable whistle cap which may be massproduced at relatively low cost.

Briefly stated, these objects are accomplished by a teakettle for boiling water, the covered kettle having a spout projecting therefrom whose mouth is normally closed by a whistle cap having an extension arm terminating in a pinion mounted for rotation at one end of a bail secured to the kettle and serving as a handle therefor. The pinion is engaged by a rack attached to the front end of an arcuate strip slidable within the hollow bail, the rear end of the strip being coupled through a slot in the bail to an external finger pad.

To pour boiling water from the kettle, the user grasps the bail with his hand and manipulates the finger pad with his finger to push the pad forward, thereby advancing the rack and causing the pinion to rotate and lift the cap from the mouth of the spout. Release of the finger pad causes the cap to drop back in place on the spout and to return the finger pad to its initial position.

OUTLINE OF DRAWINGS

For a better understanding of the invention as well as other objects and further features thereof, reference is made to the following detailed description to be read in conjunction with the accompanying drawings wherein:

FIG. 1 is a perspective view of a teakettle in accordance with the invention, the whistle cap being shown in its normal position in which it closes the spout of the kettle;

FIG. 2 is a longitudinal section taken through the midpoint of the teakettle shown in FIG. 1;

FIG. 3 is the same as FIG. 2, except that in this instance, the mechanism for lifting the whistle cap is being operated;

FIG. 4 is a section taken in the plane of line 4—4 in FIG. 2;

FIG. 5 is a section taken in the plane of line 5—5 in FIG. 4; and

FIG. 6 is a section taken in the plane of line 6—6 in FIG. 2.

DESCRIPTION OF INVENTION

Referring now to FIGS. 1 and 2, there is shown a preferred embodiment of a teakettle in accordance with the invention. The teakettle is constituted by a vessel 10 which may be of ceramic, metal, or any other suitable material, the vessel having a spout 11 projecting therefrom.

Vessel 10 is provided with a detachable rim 12 having a hollow bail 13 integral therewith, these components being preferably molded of synthetic plastic material. The rim and bail are formed of complementary half pieces. Received within the rim is a kettle cover 14 for an opening to the vessel and is provided with a handle 15 in upstanding tab form.

Fitting over the mouth of spout 11 is a whistle cap 16. The cap is provided with an extension arm 17 terminating in a pinion 18 whose gear teeth 19 lie within bail 13 at one end thereof, the exposed portion of the pinion being toothless. Pinion 18 is sandwiched between bearings 20 and 21 integral with the respective halves of the bail.

Whistle cap 16 is lifted above spout 11 by a mechanism which includes a shiftable finger pad 22 having a knurled surface, the finger pad lying on the exterior surface of the arched bail adjacent the peak thereof. Thus a user who grasps the arched bail with his hand is readibly able, with his finger 23, as shown in FIG. 3, to manipulate the finger pad to swing and lift the whistle cap.

As best seen in FIG. 2, whistle cap 15 is provided with an internal cavity 24 defined by a base 25 having an inlet orifice 26 which admits steam into the cavity, steam under pressure being generated when water in vessel 10 begins to boil. The cap also includes an outlet orifice 27 in its upper wall from which the steam is discharged, in the course of which the whistle emits a shrill sound whose pitch is determined by the dimensions of the cavity acting as a resonator.

As best seen in FIGS. 2 and 4, pinion 18 is supported for rotation between bearings 20 and 21 on a screw 28 which bridges the bearings and is locked in place by a nut 29. The screw also serves to hold the complementary half components of the bail 13 and rim 12 together. A second screw 30 and nut 31 at the top of the bail completes the assembly.

Slidable within the hollow bail is an arcuate strip 32 whose lower end terminates in a rack 33 which engages pinion gear teeth 19. The upper end of strip 32 is coupled to finger pad 22 by a ridge 34 disposed within a slot 35 in the bail, the slot serving to limit movement of the ridge.

Thus when finger pad 22 is pushed by finger 23 in the forward direction on the bail, this causes rack 33 to advance and turn pinion 18 in the clockwise direction, and thereby swing whistle cap 16 above the mouth of spout 17.

When finger 23 is released, whistle cap 16, which is cantilevered from pinion 18 and is subject to gravitational force, then drops back into place on the spout, in the course of which it acts to turn the pinion in the counterclockwise direction to return finger pad 22 to its original position on the bail.

The teakettle is readily assembled; for all that is necessary is to couple the two half pieces of the integrated rim and bail onto the lip 10L of the vessel 10, as shown in FIG. 5, and to then insert screws 28 and 30 into the holes provided therefor to bridge the pieces, the screws being locked into place by nuts 29 and 31, respectively. Inserted in a notch 32' at the end of strip 32 is a compression spring 36 which biases the strip to normally maintain the whistle cap in its closed position. In practice, a sealing gasket may be interposed between the two half pieces of the bail.

The typical teakettle having a whistle cap on the spout is otherwise a sealed vessel and has no removable cover. The reason there normally is no cover is that a cover tends to leak steam, and this leakage would impair the function of the steam-activated whistle. A sealed teakettle may be rinsed but cannot be adequately cleaned; hence in time the inner surface thereof becomes encrusted with mineral deposits and other contaminants found in ordinary tap water. These deposits are not accessible for cleaning, and may, therefore, adversely affect the quality of the water boiled in the kettle.

In the present invention, cover 14 is removable to permit thorough cleaning of vessel 10, yet the cover acts to hermetically seal the kettle (except, of course, for the spout). Cover 14 is injection molded of the same synthetic plastic material as is used for the rim and bail assembly. The rim, as best seen in FIG. 2, is provided with an inwardly projecting annular shoulder 37 on which is seated the flange 38 of cover 14. Flange 38 extends outwardly from a peripheral ledge 39 which is sealably engaged by the tip of shoulder 37. The dimensions of cover 14 relative to shoulder 37 and the resilience of the plastic material are such as to provide a press fit.

While there has been shown and described a preferred embodiment of a teakettle having whistle cap, it will be appreciated that many changes and modifications may be made therein without, however, departing from the essential spirit thereof.

I claim:
1. A teakettle for boiling water comprising:
   (A) a covered vessel having a lip surrounding its opening and a spout projecting from its body;
   (B) an integrated rim and hollow bail for the vessel, said rim engaging the lip and the bail being arched thereover;
   (C) a whistle cap normally closing said spout and having an extension arm terminating in a pinion mounted for rotation at one end of the bail, said pinion having teeth which lie within the hollow bail;
   (D) an arcuate strip slidably disposed within the bail, the front end of the strip having a rack thereon engaging said teeth; and
   (E) a finger pad slidable on the exterior of the bail at a position adjacent the top thereof, said pad being coupled through a slot in the bail to the rear end of the strip whereby by pushing the pad forward, the rack is advanced to turn the pinion and lift the cap.

2. A teakettle as set forth in claim 1, wherein said integrated rim and bail is composed of complementary half pieces.

3. A teakettle as set forth in claim 2, wherein said bail half pieces include integral bearings between which said pinion is sandwiched.

4. A teakettle as set forth in claim 3, wherein said half pieces are molded of synthetic plastic material.

5. A teakettle as set forth in claim 1, wherein the portion of said pinion which is exposed is toothless.

6. A teakettle as set forth in claim 1, wherein said rear end of said strip is provided with a ridge which lies within said slot and is joined to the pad.

7. A teakettle as set forth in claim 6, wherein the surface of the pad is knurled.

8. A teakettle as set forth in claim 4, wherein the cover for the opening of the vessel is fabricated of the same material as the half pieces and is adapted to seal the vessel to prevent the emission of steam through the mouth.

* * * * *